(12) United States Patent
Ashihara et al.

(10) Patent No.: US 6,500,584 B1
(45) Date of Patent: Dec. 31, 2002

(54) MANGANESE DRY BATTERIES

(75) Inventors: Ryohei Ashihara, Neyagawa (JP);
Tetsuya Kobayashi, Sakai (JP); Keiji Ogino, Katano (JP); Michiko Inui, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/265,665

(22) Filed: Mar. 10, 1999

(30) Foreign Application Priority Data

Mar. 27, 1998 (JP) .............................. 10-81739

(51) Int. Cl.[7] .......................... H01M 4/50; H01M 4/42; H01M 2/16
(52) U.S. Cl. ...................... 429/224; 429/215; 429/229; 429/248
(58) Field of Search ................ 429/224, 229, 429/248, 134, 207, 215

(56) References Cited

U.S. PATENT DOCUMENTS

| | | | |
|---|---|---|---|
| 3,870,564 A | | 3/1975 | Takamura et al. |
| 4,037,033 A | * | 7/1977 | Takamura et al. .......... 429/206 |
| 4,224,391 A | * | 9/1980 | Eisenberg ................... 429/203 |
| 4,268,589 A | * | 5/1981 | Tamminen ................. 429/207 |
| 4,465,747 A | * | 8/1984 | Evans |
| 4,478,921 A | * | 10/1984 | Langan |
| 5,605,774 A | | 2/1997 | Ekern et al. |

FOREIGN PATENT DOCUMENTS

| | | |
|---|---|---|
| FR | 2 411 493 A | 7/1979 |
| JP | 53-034613 B | 9/1978 |
| JP | 63-279565 A | 11/1988 |
| JP | 63-285869 A | 11/1988 |
| JP | 02-253560 A | 10/1990 |
| JP | 02-297863 A | 12/1990 |
| JP | 04001357 A | 1/1992 |
| JP | 06196155 A | 7/1994 |
| JP | 8273653 A | * 10/1996 |

OTHER PUBLICATIONS

Hawley's Condensed Chemical Dictionary: Thirteenth Edition, John Wiley & Sons, pp. 119, 427–428 (1997).

* cited by examiner

Primary Examiner—Carol Chaney
Assistant Examiner—Tracy Dove
(74) Attorney, Agent, or Firm—Akin, Gump, Strauss, Hauer & Feld, L.L.P.

(57) ABSTRACT

There is described in the specification a mercury-free manganese primary dry battery wherein the cathode mixture contains boric acid or an alkali borate at a ratio of 0.04 to 0.4 parts by weight per 100 parts by weight of manganese dioxide as a boron conversion value or wherein the separator contains boric acid or an alkali borate at a ratio of 0.1 to 8.0 parts by weight per 100 parts by weight of a dry solid content in the pasting agent. Such battery has excellent discharge properties under light loading conditions.

4 Claims, 1 Drawing Sheet

MANGANESE DRY BATTERIES

BACKGROUND OF THE INVENTION

Figure 1:
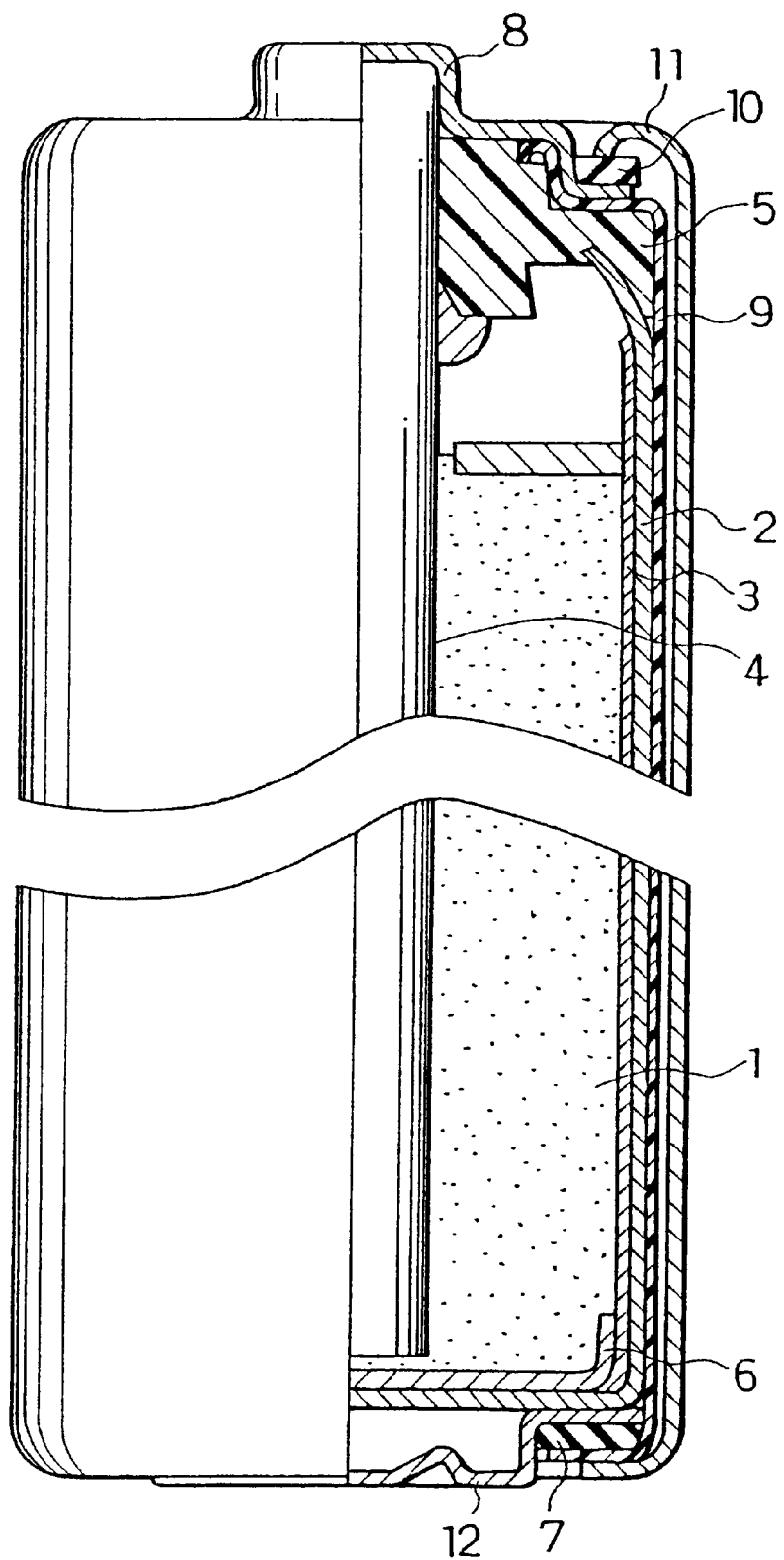

The present invention relates to a mercury-free manganese dry battery and more specifically to an improvement in discharge performance of the manganese dry battery.

Mercury has mainly been used as a corrosion inhibitor of the zinc anode can in manganese dry batteries. In this case, mercury is included in the separator and incorporated in the battery. The separator is obtained by applying a sizing agent on a separator base sheet and drying it, where the pasting agent is provided by dissolving starch and a binder in an alcohol solvent. The cathode mixture is covered with the separator and charged in the zinc anode can. Mercury of several % by weight has generally been added to the pasting agent, which is applied on the separator. When in close contact of the separator with the inner surface of the zinc can, an amalgam is formed on the surface of the zinc can and thus effectively prevents corrosion of the zinc can.

From the viewpoint of the environmental protection, a variety of mercury-free dry batteries have been developed and proposed: for example, one using a zinc alloy of high corrosion resistance (for example, JAPANESE PATENT LAID-OPEN GAZETTE No. 6-196155) and one with an anti-corrosive additive (for example, JAPANESE PATENT LAID-OPEN GAZETTE No. 4-10357).

When a mercury-free manganese dry battery is discharged under a specific loading resistance, the discharge capacity may be lowered extremely. This phenomenon specifically occurs in the course of discharge under light loading conditions.

The extreme decrease in discharge capacity may be ascribed to an abrupt increase in internal resistance of the battery in the course of discharge in the case where the manganese dry battery is discharged at the resistance of light loading.; The abrupt increase leads to an abrupt drop of the closed path voltage in the course of discharge under light loading conditions.

One possible means to prevent the increase in internal resistance is to increase the amount of electrolyte solution in the cathode mixture or in the pasting agent of the separator, or alternatively increase the amount of carbon used as the conductive material in the cathode mixture. These methods, however, decrease the amount of manganese dioxide in the cathode mixture and thereby deteriorate the overall discharge performance of the batteries including the discharge performance under the heavy loading conditions.

The object of the present invention is to solve the above problems and to provide a mercury-free manganese dry battery that prevents an increase in internal resistance in the course of discharge and has excellent discharge properties especially under light loading conditions.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE VIEW OF THE DRAWING

FIG. 1 is a partly broken sectional view illustrating a manganese dry battery embodying the present invention.

BRIEF SUMMARY OF THE INVENTION

At least part of the above and the other related objects is realized by a mercury-free manganese dry battery comprising a cathode mixture containing manganese dioxide as an active material, an anode containing zinc as an active material, and a separator including paper with a pasting agent applied thereon, wherein the cathode mixture contains either one of boric acid and an alkali borate at a ratio of 0.04 to 0.4 parts by weight per 100 parts by weight of manganese dioxide as a boron conversion value.

In accordance with another aspect of the present invention, the separator contains either one of boric acid and an alkali borate at a ratio of 0.1 to 8.0 parts by weight per 100 parts by weight of a dry solid content included in the pasting agent as a boron conversion value.

The arrangement of the present invention provides a manganese dry battery that prevents an increase in internal resistance in the course of discharge and has excellent discharge properties especially under light loading conditions.

DETAILED DESCRIPTION OF THE INVENTION

In a manganese dry battery embodying the present invention, boric acid is contained in the cathode mixture by blending and stirring powdery boric acid, manganese dioxide as the active material of the cathode, and carbon as the conductive material, by adding an electrolyte to the mixture, and, then, by kneading the mixture well.

Another method of making boric acid contained in the cathode mixture first blends and stirs manganese dioxide and carbon as the conductive agent, then adds an electrolyte with boric acid dissolved therein to the mixture, and kneads the mixture well.

An alkali borate may be used, instead of boric acid. Typical examples of the alkali borate include sodium borate, potassium borate and the like.

Boric acid or alkali borate functions to prevent the internal resistance of a mercury-free manganese dry battery from increasing under a specific discharge condition. In order to obtain such effects, it is required that the cathode mixture contains either one of boric acid and an alkali borate at a ratio of 0.04 to 0.4, more preferably 0.08 to 0.2 parts by weight per 100 parts by weight of manganese dioxide as a boron conversion value.

The boron conversion value of less than 0.04 parts by weight does not effectively prevent the internal resistance of the battery from increasing in the course of discharge. The boron conversion value of greater than 0.4 parts, by weight, on the other hand, does not have any additional effects but undesirably increases the internal resistance of the battery before discharge. This may deteriorate the battery performances under the continuous discharge condition of heavy loading, such as, 10 k$\Omega$.

In a manganese dry battery of another embodiment according to the present invention, boric acid is, contained in the pasting agent of the separator. The separator is obtained by applying a boric acid-containing pasting agent on a base sheet, such as kraft paper, and by drying the pasting agent. It is preferable that the pasting agent mainly includes starch and a binder.

An alkali borate may be used, instead of boric acid. Typical examples of the alkali borate include sodium borate, potassium borate and the like. It is required that the separator contains either one of boric acid and an alkali borate at a ratio of 0.1 to 8.0, more preferably 1.0 to 4.0 parts by weight per 100 parts by weight of a dry solid content in the pasting agent as a boron conversion value. The basis of this range has been described previously in the case where boric acid is contained in the cathode mixture. Further, if the content of the boric acid or alkali borate in the pasting agent is more than 4.0 parts by weight, there is the potential problem that the pasting agent is liable to separate or fall out from the separator. Considering such a problem, the content of the boric acid or alkali borate in the pasting agent should preferably be 1.0 to 4.0 parts by weight.

The actual content of boric acid in the pasting agent can be less than the content of boric acid included in the cathode mixture. This is because boric acid included in the pasting agent more effectively depresses the battery reactions, which lead to an increase in internal resistance of the battery in the course of discharge.

The present invention is described in detail with an embodiment as follows.

FIG. 1 is a partly broken sectional view illustrating a manganese dry battery R6 as one embodiment of the present invention.

Referring to FIG. 1, a cathode mixture 1 with manganese dioxide as an active material is inserted in a zinc can 2 via a separator 3 and a bottom sheet of paper 6. A carbon rod 4 functioning as a current collector of the cathode is inserted on the center of the cathode mixture 1. An opening of the zinc anode can 2 is sealed with a resin gasket 5. An anode terminal plate 12 and a seal ring 7 are disposed on the bottom face of the zinc anode can 2. A projecting end of the carbon rod 4 is covered with a cathode terminal plate 8. The circumference of the zinc anode can 2 is covered with a heat-shrinkable resin tube 9, which is further wrapped with an metal jacket 11. An insulating ring 10 is interposed between the cathode terminal plate 8 and the upper end of the metal jacket 11.

The cathode mixture 1 was prepared by adding 75 parts by weight of an electrolyte to 100 parts by weight of a cathode mixture where the mixing weight ratio of manganese dioxide to acetylene black was 7 to 1. The electrolyte was provided by dissolving 43 parts by weight of zinc chloride and 1 part by weight of ammonium chloride in 100 parts by weight of water.

The separator 3 was obtained by applying a pasting agent on kraft paper and drying the pasting agent. The pasting agent was provided by dissolving crosslinked starch and a binder mainly consisting of polyvinyl acetate in an alcohol solvent.

The zinc anode can 2 used here was a zinc alloy containing 0.4% by weight of lead.

Examples 1 to 4 and Comparative Examples 1 to 4

As shown in Table 1, dry batteries "d" to "g" of examples, where the cathode mixture respectively contained powdery boric acid at the ratio of 0.04 to 0.4 parts by weight per 100 parts by weight of manganese dioxide as the boron conversion value, and dry batteries "c" and "h" of comparative examples, where the cathode mixture respectively contained powdery boric acid at the ratio of 0.01 parts by weight and 0.8 part by weight, were manufactured by the above method.

Another dry battery "b" was also manufactured by the above method, except that no boric acid was contained. This corresponds to a prior art battery.

Still another dry battery "a" of comparative example was manufactured by the above method, except that no boric acid was contained and that 2 parts by weight of mercury(I) chloride as the mercury conversion value was added to 100 parts by weight of the dry solid component in the pasting agent of the separator.

Examples 5 to 9

Dry batteries "i" to "m" of the other example of the present invention was also prepared as shown in Table 1, where 0.1 to 8.0 parts by weight of boric acid as the boron conversion value was contained in 100 parts by weight of the dry solid content in the pasting agent of the separator in the manganese dry battery R6.

Table 1 shows the data of time duration (end voltage: 0.9 V) in the case where the dry batteries of Examples and comparative examples were continuously discharged under the loading of 10 kΩ. Table 1 also shows the observed internal resistance of each battery at the point of time when the discharge capacity of the prior art battery "b" was extremely lowered, which showed the termination of the time duration, in the course of continuous discharge under the loading of 10 kΩ.

TABLE 1

| Battery | Boric acid content (parts by weight per 100 parts of dry solid content as a Doron conversion value) | | Addition of Mercury | Discharge under loading of 10 kΩ | |
|---|---|---|---|---|---|
| | In cathode mixture | In pasting agent of separator | | Duration time (ratio) | Internal resistance |
| a | 0 | 0 | Added | 100 | 10 |
| b | 0 | 0 | Not added | 66 | 100 |
| c | 0.01 | 0 | Not added | 70 | 100 |
| d | 0.04 | 0 | Not added | 95 | 30 |
| e | 0.08 | 0 | Not added | 100 | 9 |
| f | 0.2 | 0 | Not added | 100 | 8 |
| g | 0.4 | 0 | Not added | 100 | 10 |
| h | 0.8 | 0 | Not added | 100 | 12 |
| i | 0 | 0.1 | Not added | 90 | 23 |
| j | 0 | 0.4 | Not added | 98 | 20 |
| k | 0 | 1.0 | Not added | 100 | 15 |
| l | 0 | 4.0 | Not added | 100 | 13 |
| m | 0 | 8.0 | Not added | 99 | 17 |

As clearly understood from the data of Table 1, like the boric acid-free but mercury-containing. comparative example "a", the mercury-free dry batteries "d" to "g" of the present invention where powdery boric acid was contained in the cathode mixture, had significantly better performances than that of the boric acid-free prior art battery "b", in the course of continuous discharge under the light loading condition of 10 kΩ. Further, among the dry batteries "d" to "g" of the present invention, the dry batteries "e" and "f" are more preferable.

The dry battery "c" where the content of boric acid in the cathode mixture was 0.01 parts by weight did not have sufficient effect. The dry battery "h" where the content of boric acid was 0.8 parts by weight, on the other hand, did not improve the effect but undesirably increased the internal resistance of the battery before discharge. This deteriorates the discharge performances of the battery under heavy loading conditions.

The dry battery "i" to "m" of the present invention where boric acid was contained in the pasting agent of the separator also had significantly better performance than that of the boric acid-free prior art battery "b". Further, among them, the dry batteries "k" and "l" are more preferable.

Although boric acid is contained in the cathode mixture or in the pasting agent of the separator in the above examples, alkali borates, such as sodium borate and potassium borate, may exert the similar effects.

As described above, the present invention provides a mercury-free manganese dry battery having excellent discharge properties under light loading conditions.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A mercury-free manganese primary dry battery comprising a cathode mixture containing manganese dioxide as an active material, an anode containing zinc as an active material, and a separator including paper with a pasting agent applied thereon, wherein the cathode mixture contains at least one of boric acid and an alkali borate at a ratio of 0.08 to 0.4 parts by weight boron per 100 parts by weight of manganese dioxide as a boron conversion value.

2. The mercury-free manganese primary dry battery in accordance with claim 1, wherein the cathode mixture contains at least one of boric acid and an alkali borate at a ratio of 0.08 to 0.2 parts by weight boron per 100 parts by weight of manganese dioxide as a boron conversion value.

3. A mercury-free manganese primary dry battery comprising a cathode mixture containing manganese dioxide as an active material, an anode containing zinc as an active material, and a separator including paper with a pasting agent applied thereon, wherein the separator contains at least one of boric acid and an alkali borate at a ratio of 0.1 to 8.0 parts by weight boron per 100 parts by weight of a dry solid content included in the pasting agent as a boron conversion value.

4. The mercury-free manganese primary dry battery in accordance with claim 3, wherein the separator contains at least one of boric acid and an alkali borate at a ratio of 1.0 to 4.0 parts by weight boron per 100 parts by weight of a dry solid content included in the pasting agent as a boron conversion value.

* * * * *